US006851221B2

(12) United States Patent
Layt et al.

(10) Patent No.: US 6,851,221 B2
(45) Date of Patent: Feb. 8, 2005

(54) FLATS AND TRAY SYSTEMS FOR PLANT BORDERS AND METHODS FOR USING SAME

(75) Inventors: Todd Anthony Layt, New South Wales (AU); Tobey A. Wagner, Mt. Pleasant, SC (US)

(73) Assignee: VersaScapes, L.L.C., Mt. Pleasant, SC (US)

( * ) Notice: Subject to any disclaimer, the term of this patent is extended or adjusted under 35 U.S.C. 154(b) by 0 days.

(21) Appl. No.: 10/230,510

(22) Filed: Aug. 29, 2002

(65) Prior Publication Data

US 2004/0040209 A1 Mar. 4, 2004

(51) Int. Cl.[7] .............................................. A01G 9/02
(52) U.S. Cl. .............................................. 47/86; 47/85
(58) Field of Search ..................... 47/66.5, 86, 65.5, 47/75, 85, 68, 41.1, 41.14, 87; 206/505, 1.7, 1.8, 1.9, 560, 518; 111/105; 220/23.9, 23.88, 495.05, 23.87, 23.91

(56) References Cited

U.S. PATENT DOCUMENTS

| | | | | |
|---|---|---|---|---|
| 3,660,934 A | * | 5/1972 | Pollack et al. | 47/84 |
| 3,751,852 A | * | 8/1973 | Schrepper | 47/87 |
| 3,903,641 A | * | 9/1975 | Hoffman et al. | 47/79 |
| 4,047,633 A | * | 9/1977 | Trombly | 220/592.2 |
| 4,122,973 A | * | 10/1978 | Ahern | 220/495.02 |
| 4,972,951 A | * | 11/1990 | Vartanian | 206/387.1 |
| 5,011,013 A | * | 4/1991 | Meisner et al. | 206/373 |
| 5,022,183 A | * | 6/1991 | Bohlmann | 47/86 |
| 5,300,748 A | * | 4/1994 | Colombo | 219/734 |
| 5,409,510 A | * | 4/1995 | Houweling | 47/62 C |
| 5,514,299 A | * | 5/1996 | Kalwara | 252/511 |
| 5,870,857 A | * | 2/1999 | Yerich | 47/87 |
| 5,953,859 A | * | 9/1999 | Cochran et al. | 47/66.5 |
| 6,415,945 B1 | * | 7/2002 | Zank et al. | 220/657 |
| 6,539,882 B2 | * | 4/2003 | Layt | 111/105 |
| 2002/0062770 A1 | | 5/2002 | Layt | 111/105 |

FOREIGN PATENT DOCUMENTS

| | | | | |
|---|---|---|---|---|
| AU | B-65620/96 | | 9/1996 | ........... A01G/9/10 |
| AU | 136024 | | 12/1997 | |
| GB | 2074834 A | * | 11/1981 | ........... A01G/9/02 |
| JP | 403239600 A | * | 10/1991 | ................ 206/1.7 |

* cited by examiner

Primary Examiner—Son T. Nguyen
(74) Attorney, Agent, or Firm—Myers Bigel Sibley & Sajovec, P.A.

(57) ABSTRACT

A plant border system includes a flat and a plant tray. The flat defines a flat cavity and a flat top opening communicating with the flat cavity. An upstanding rim surrounds at least a portion of the flat top opening. The plant tray defines a tray cavity and a tray top opening communicating with the tray cavity. The tray cavity has a tray width and a tray length that is greater than the tray width. The plant tray includes a collar surrounding at least a portion of the tray top opening, the collar defining a downwardly opening channel. The flat is adapted to receive the plant tray in the flat cavity such that the rim is received in the channel and the flat is thereby structurally reinforced by the plant tray to resist flexure.

44 Claims, 10 Drawing Sheets

FLATS AND TRAY SYSTEMS FOR PLANT BORDERS AND METHODS FOR USING SAME

FIELD OF THE INVENTION

The present invention relates to plant trays and flats and, more particularly, to flats and tray systems for plant borders and methods for using the same.

BACKGROUND OF THE INVENTION

It is often desirable to plant a substantially continuous or semi-continuous strip of plants to form a landscape edging commonly referred to as a plant border. Plant borders are often planted along driveways, sidewalks, garden beds, fence lines, paths, courtyards and the like. It is desirable to provide such strips of plants in a manner that allows for convenient handling and planting. It is further desirable to provide means for cost-effectively and conveniently growing and packaging plant borders.

SUMMARY OF THE INVENTION

According to embodiments of the present invention, a plant border system includes a flat and a plant tray. The flat defines a flat cavity and a flat top opening communicating with the flat cavity. An upstanding rim surrounds at least a portion of the flat top opening. The plant tray defines a tray cavity and a tray top opening communicating with the tray cavity. The tray cavity has a tray width and a tray length that is greater than the tray width. The plant tray includes a collar surrounding at least a portion of the tray top opening, the collar defining a downwardly opening channel. The flat is adapted to receive the plant tray in the flat cavity such that the rim is received in the channel and the flat is thereby structurally reinforced by the plant tray to resist flexure.

According to further embodiments of the present invention, a flat is provided for carrying and supporting a plant tray of the type defining a tray cavity and a tray top opening communicating with the tray cavity, the tray cavity having a tray width and a tray length that is greater than the tray width, the plant tray including a collar surrounding at least a portion the tray top opening, the collar defining a downwardly opening channel. The flat defines a flat cavity and a flat top opening communicating with the flat cavity. The flat includes an upstanding rim surrounding at least a portion the flat top opening. The flat is adapted to receive the plant tray in the flat cavity such that the rim is received in the channel and the flat is thereby structurally reinforced by the plant tray to resist flexure.

According to method embodiments of the present invention, a method for using a plant tray system includes providing a flat defining a flat cavity and a flat top opening communicating with the flat cavity. The flat includes an upstanding rim surrounding at least a portion of the flat top opening. A plant tray defining a tray cavity and a tray top opening communicating with the tray cavity is provided. The tray cavity has a tray width and a tray length that is greater than the tray width. The plant tray includes a collar surrounding at least a portion of the tray top opening. The collar defines a downwardly opening channel. The plant tray is placed into the flat cavity such that the rim is received in the channel and the flat is thereby structurally reinforced by the plant tray to resist flexure.

Objects of the present invention will be appreciated by those of ordinary skill in the art from a reading of the figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE PREFERRED EMBODIMENTS

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

As used herein, "plant border" means an amount of growing medium into which a strip of a plurality of plants is fully or partially embedded. The plants may extend upwardly from the growing medium with the roots of the plants embedded in the growing medium. As used herein, "growing medium" means a substance that serves to support and sustain the plants and which is suitable for planting in a desired permanent or semi-permanent location with the strip of plants. Preferred growing media include potting soil, pine bark, peat and sand. Other suitable growing media include coir, compost and perlite. Exemplary plants which may be grown and planted using the present invention include, for example, Mondo Grass Fescue, Agapanthas, Leriope, flowers and other suitable plant varieties used for borders or when new planting is desired for erosion control and/or aesthetics.

With reference to FIGS. 1 and 8–12, a plant border tray system according to preferred embodiments of the present invention is shown therein and generally designated 10. The plant border system 10 includes one or more plant trays 100 and a support flat 150. As discussed in further detail below, the flat 150 may be used to reinforce the plant trays 100 during filling, growing, storing, transporting and handling. The plant trays 100 are preferably substantially identical. The plant trays 100 may be filled with a plant border to form a plant border assembly such as the plant border assembly 101 shown in FIG. 13.

Figure 1:
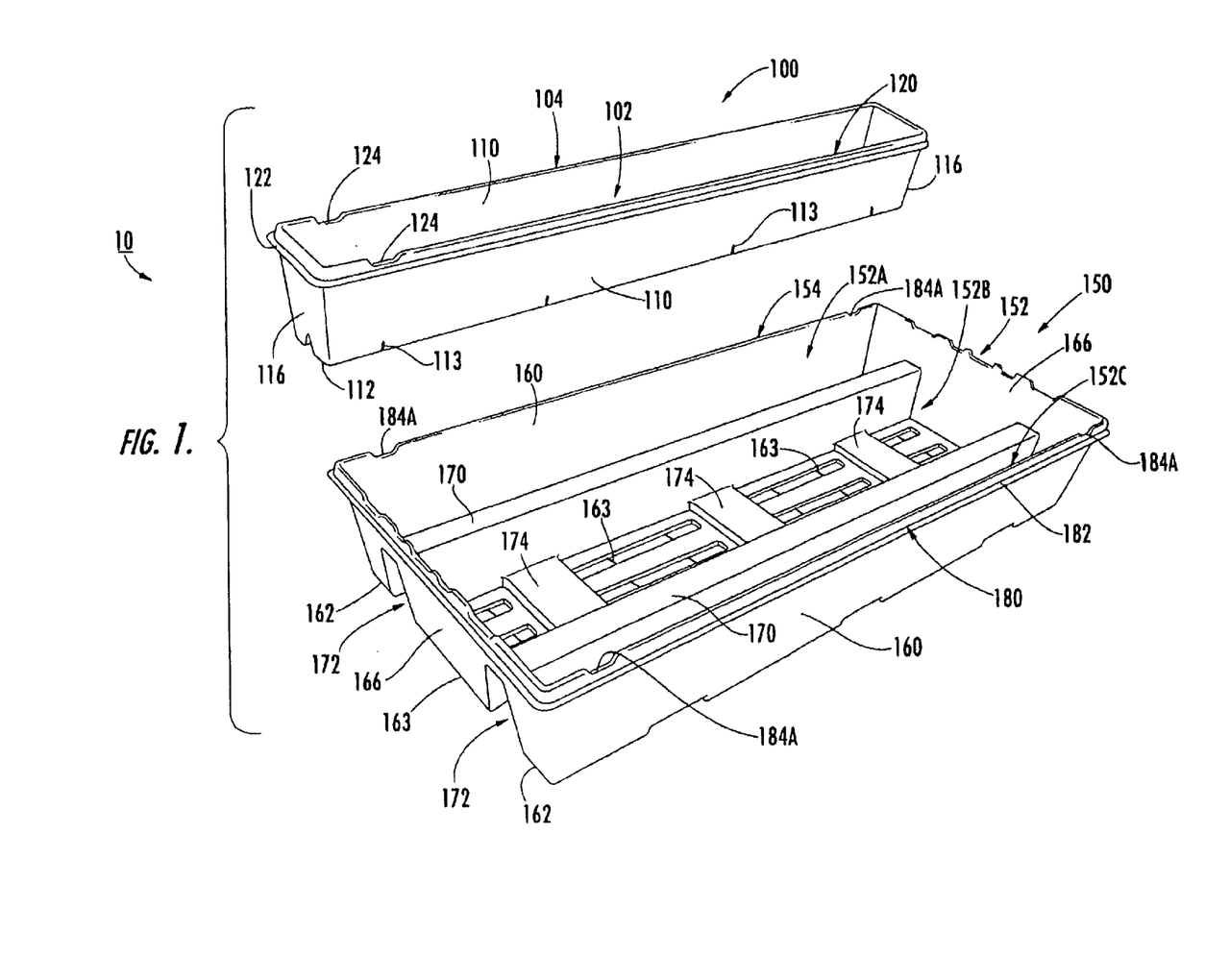
FIG. 1 is an exploded, perspective view of a plant border system according to embodiments of the present invention.
Figure 6:
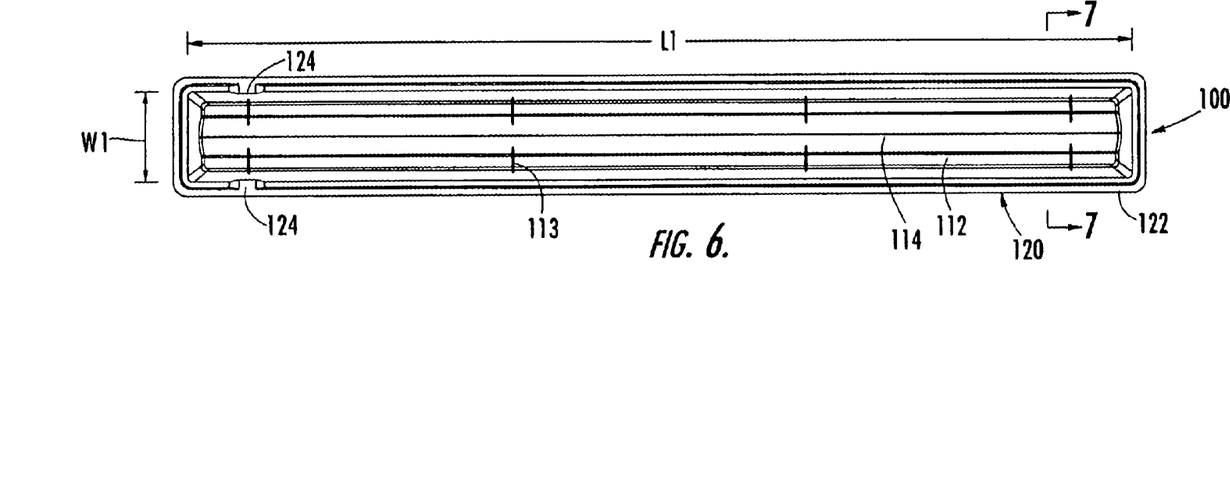
FIG. 6 is a top plan view of a plant tray forming a part of the plant tray system of FIG. 1.
Figure 7:
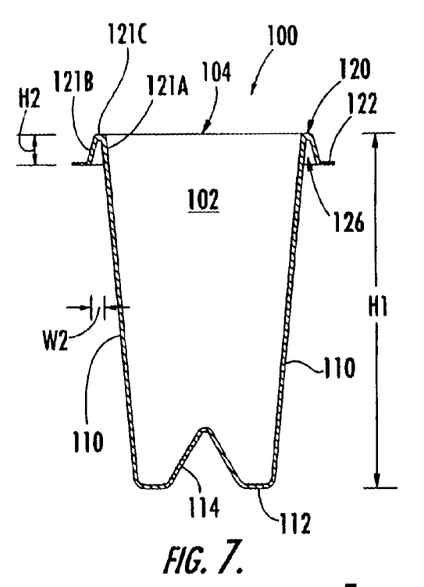
FIG. 7 is a cross-sectional view of the plant tray of FIG. 6 taken along the line 7—7 of FIG. 6.

With reference to FIGS. 1, 6 and 7, an exemplary one of the trays 100 includes a pair of opposed, tapered side walls 110 and a pair of opposed, tapered end walls 116. The bottom of the tray 100 is formed by a pair of flat bottom walls 112, and an inverted V-shaped bottom wall 114. The inverted V-shaped walls 114 assist in stabilizing and inhibiting flexure of the tray 100. The tray 100 defines a longitudinally extending cavity 102 and an upper, longitudinally extending opening 104 which communicates with the cavity 102. Drain holes 113 are formed in the bottom walls 112.

Preferably, the length L1 (as measured from end wall 116 to end wall 116 at the top opening 104; FIG. 6) of the cavity 102 is greater than the width W1 (as measured from side wall 110 to side wall 110 at the top opening 104; FIG. 6) of the cavity 102. More preferably, the length L1 is at least six (6) times the width W1. Most preferably, the length L1 is between about six (6) and fourteen (14) times the width W1. Preferably, the length L1 is between about 330 and 650 mm and the width W1 is between about 38 and 76 mm. Preferably, the length L1 is at least six (6) times the height H1 (FIG. 7) of the cavity 102. The height H1 of the cavity 102 is preferably between about 38 and 98 mm. Preferably, the cavity 102 has a volume of between about 600 and 2300 cm$^3$.

A reinforcing collar 120 surrounds the upper portions of the side walls 110 and the end walls 116. As shown in FIG. 7, the collar 120 includes an inner wall 121A formed from the upper portions of the of the walls 110, 116 and an outer wall 121B joined to the inner wall 121A along a fold 121C. The collar 120 is generally inverted U-shaped and defines a downwardly opening channel 126. A flange 122 surrounds the tray 100 and extends horizontally outwardly from the collar 120. The vertical depth H2 of the channels 126 is preferably at least 8 mm. More preferably, the depth H2 is between about 5 and 10 mm. The maximum width W2 of the channels 126 is preferably at least 3 mm. More preferably, the width W2 is between about 2 and 4 mm.

Recesses 124 are molded into the collar 120 on either side. Preferably, the recesses 124 are positioned a distance of between about 50 and 190 mm from the adjacent end wall 116. Using the recesses 124, a user may cut the tray 100 to remove an end portion of the tray to form an end opening.

Figure 10:
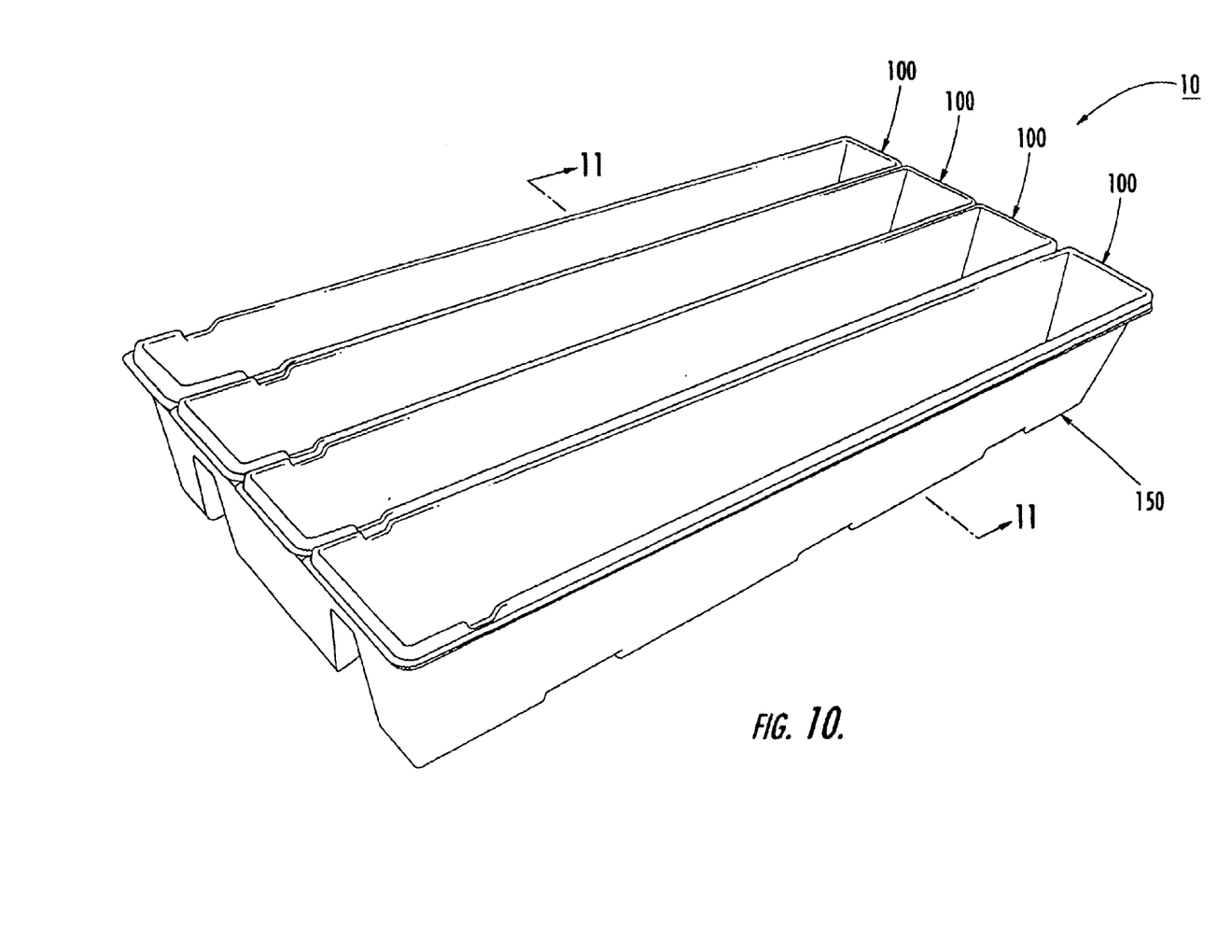
FIG. 10 is a perspective view of the plant tray system of FIG. 1 in a further configuration.
Figure 11:
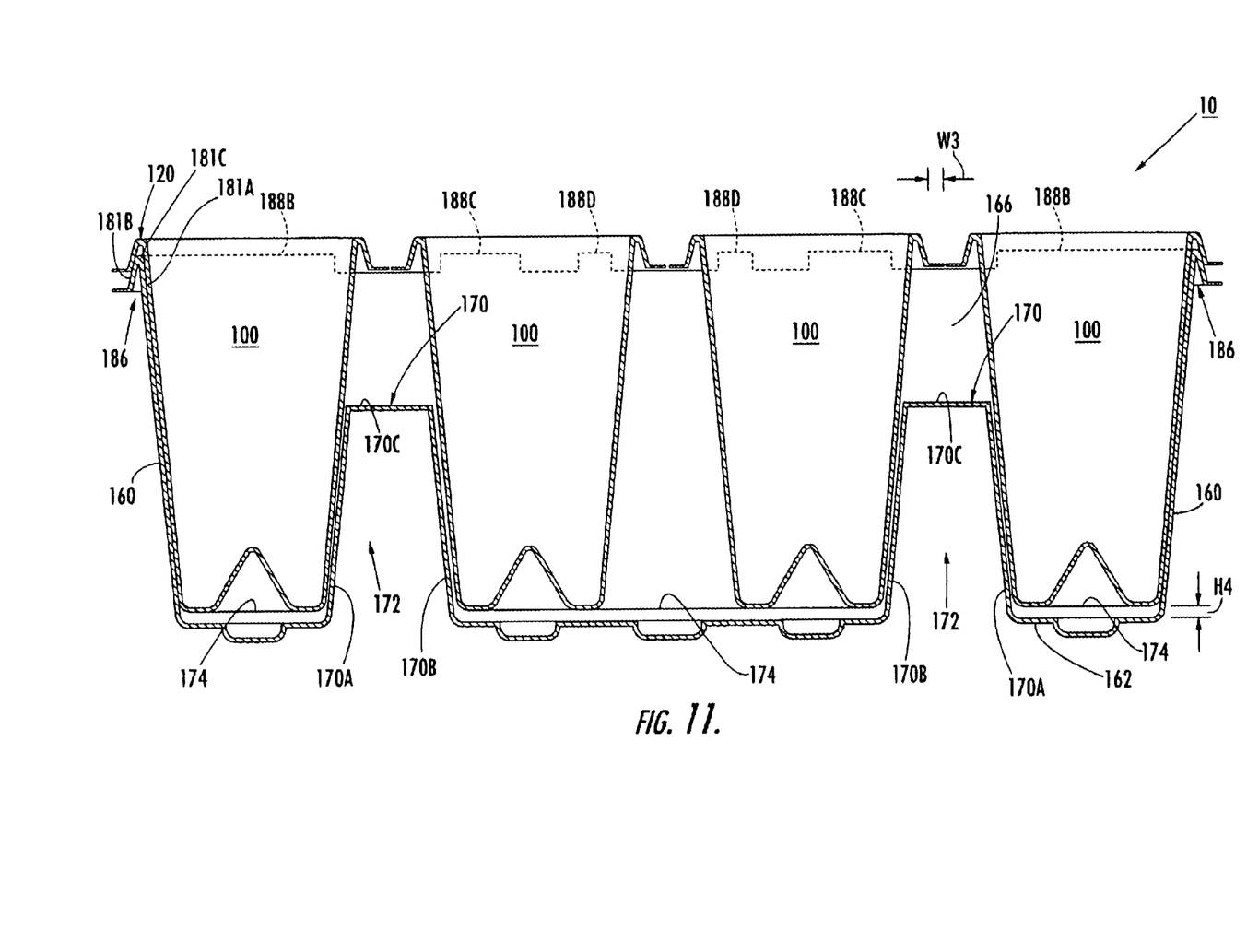
FIG. 11 is a cross-sectional view of the plant tray system of FIG. 1 taken along the line 11—11 of FIG. 10.

The width W3 (FIG. 11) of the flange 122 is preferably selected to provided a prescribed spacing between the respective cavities 102 of adjacent trays 100 when the adjacent flanges 120 of the trays are in or are approximately in side-by-side abutment as shown in FIGS. 10 and 11. More particularly, the width W3 of the flange 122 is selected to provide a desired gap for growth of plants in the trays 100 such that the plants of adjacent trays 100 will not "grow into" (i.e., interfere with) each other during the intended period between planting or placement in the trays 100 and removal from the trays 100 (typically between about 45 and 600 days). Preferably, the width W3 is at least 3 mm. More preferably, the width W3 is between about 2 and 4 mm. By providing the desired distance between plants, the plants are provided with room to fill out during growth periods.

The plant trays 100 are preferably formed of a continuous, molded, polymeric material. Suitable polymeric materials for the plant trays 100 include high impact polystyrene, ABS, PVC and polypropylene. The walls forming the plant trays 100 preferably have a substantially uniform thickness. Preferably, the thickness of the walls is less than 0.07 mm, and more preferably, is between about 0.02 and 0.07 mm. As a result, the walls of the plant trays 100 may be inherently flexible. While the rigidity of the trays 100 may be enhanced by the collar 120, the trays 100 are nonetheless susceptible to flexure when in use, particularly when loaded with a plant border (e.g., the plant border 6).

Figure 13:
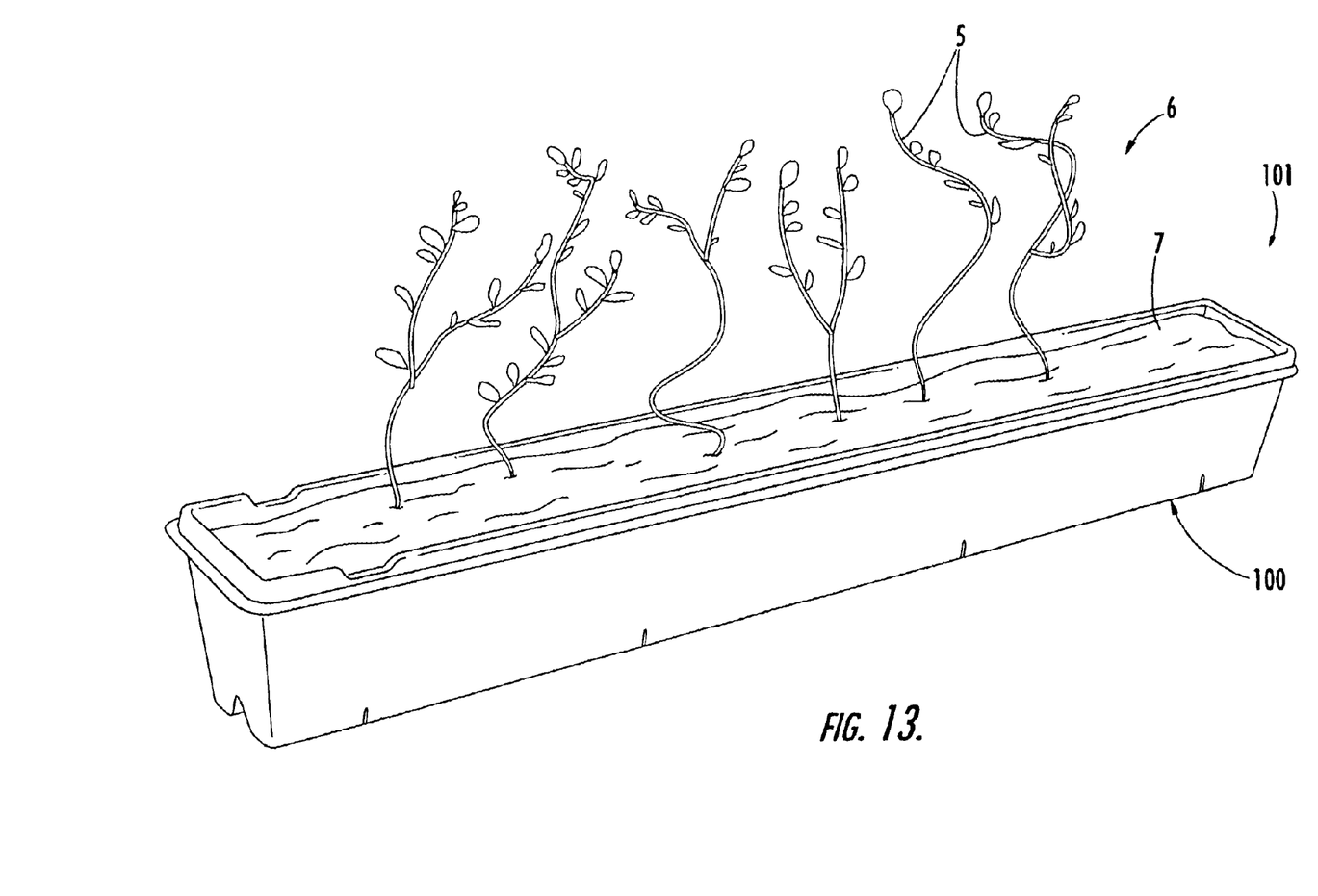
FIG. 13 is a perspective view of a plant border assembly including the plant tray of FIG. 6.

A tray 100 and a plant border 6 together form a plant border assembly 101 as shown in FIG. 13. The plant border 6 includes a growing medium 7 (e.g., soil) disposed in the cavity 102 and a plurality of plants 5 which have roots embedded in the growing medium 7 and which extend upwardly through the opening 104 of the tray 100. While the plants 5 are shown as having substantial portions above the soil, the tray 100 may alternatively hold seeds or sprigs in the soil and ready for planting.

With reference to FIGS. 1–5, the flat 150 includes a pair of opposed, tapered side walls 160 and a pair of opposed, tapered end walls 166. The bottom of the flat 150 is formed by a pair of flat bottom walls 162 and laterally extending raised walls 174. The flat 150 defines a cavity 152 and an upper, longitudinally extending opening 154 which communicates with the cavity 152. A pair of longitudinally extending separator walls 170 extend from end wall 166 to end wall 166 and define troughs 152A, 152B and 152C in the cavity 152. With reference to FIG. 11, each separator wall 170 includes a tapered inner wall 170B, a tapered outer wall 170A and a top wall 170C connecting the respective walls 170A and 170B. The separator walls 170 define respective lengthwise extending lower channels 172. Drain holes 163 are formed in the bottom walls 162.

Figure 2:
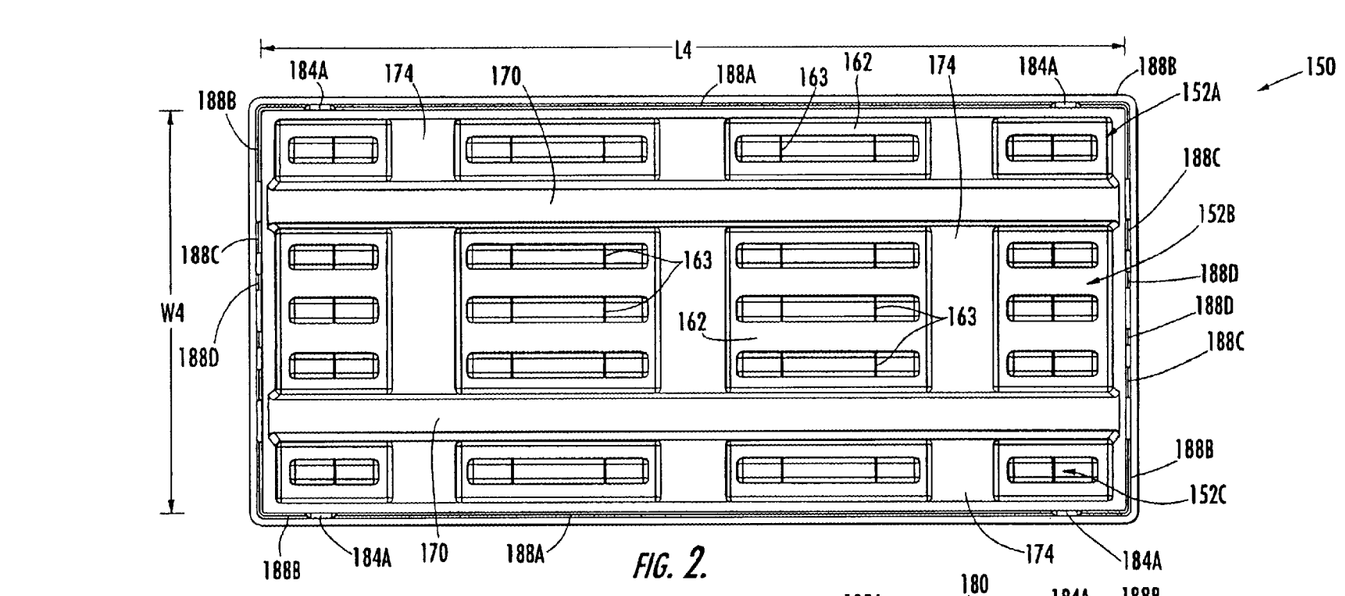
FIG. 2 is a top plan view of a flat forming a part of the plant tray system of FIG. 1.
Figure 3:
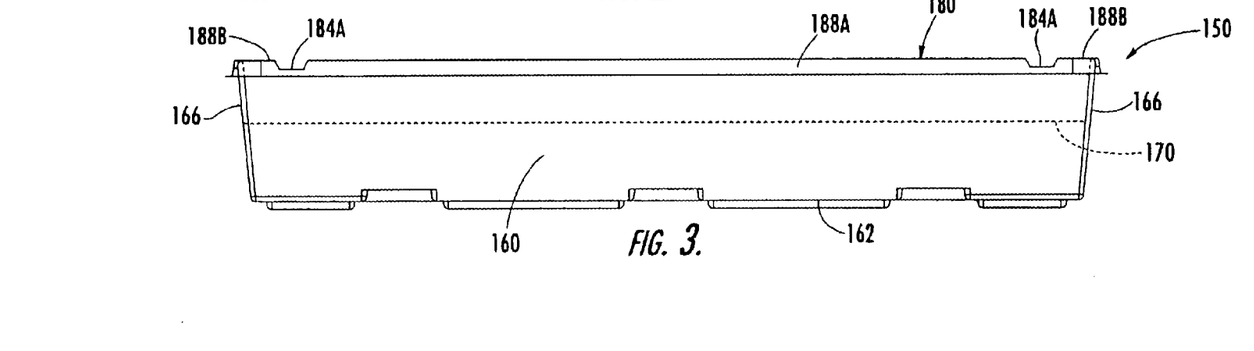
FIG. 3 is a side view of the flat of FIG. 2.

Preferably, the length L4 (as measured from end wall 166 to end wall 166 at the top opening 154; FIG. 2) of the cavity 152 is equal to the distance from the outer surface of the tray end wall 116 to the outer surface of the opposed tray end wall 116, plus a prescribed tolerance as discussed below. Preferably, the width W4 (as measured from side wall 160 to side wall 160 at the top opening 154; FIG. 2) of the cavity 152 is sized to accommodate four of the trays 100 in close side-by-side proximity with their respective flanges 122 disposed substantially immediately adjacent one another as shown in FIG. 11. The raised walls 174 are preferably raised a height H4 (FIG. 11) of between about 2 and 3 mm above the bottom walls 162 to allow for drainage and air pruning of plants.

A rim 180 surrounds the upper portions of the side walls 160 and the end walls 166. Preferably and as shown in FIG. 11, the rim 180 includes an inner wall 181A formed from the upper portions of the of the walls 160, 166 and an outer wall 181B joined to the inner wall 181A along a fold 181C. The rim 180 is generally inverted U-shaped and defines a downwardly opening channel 186. A flange 182 surrounds the flat 150 and extends horizontally outwardly from the rim 180.

The rim 180 has a non-uniform profile. The rim 180 includes relatively long lengthwise extending, raised side portions 188A, L-shaped, raised corner portions 188B, raised, laterally extending portions 188C, raised, laterally extending portions 188D, lengthwise extending recesses 184A, laterally extending recesses 184B, laterally extending recesses 184C, and a laterally extending recess 184D. The height H5 (FIG. 4) of the rim portions 188A, 188B, 188C, 188D above the recesses 184A, 184B, 184C, 184D is preferably at least 100 percent of the depth of the channels 126. More preferably, the height H5 is between about 3 and 4 mm.

The flat 150 is preferably formed of a continuous, molded, polymeric material. Suitable polymeric materials for the flat 150 include high impact polystyrene, ABS, PVC and polypropylene. The walls forming the flat 150 preferably have a substantially uniform thickness. Preferably, the thickness of the walls is less than 0.07 mm and, more preferably, is between about 0.02 and 0.07 mm. Thus, the walls of the flat 150 may be inherently flexible. The actual thickness may depend on the soil weight and desired load requirements. While the rigidity of the flat 150 may be enhanced by the rim 180, the flat 150 may nonetheless be susceptible to flexure when no plant trays 100 are installed in the cavity 152.

The tray system 10 may be used as follows to hold one or more of the trays 100. The trays 100 may be empty or filled with growing medium and plants or other material.

Figure 8:
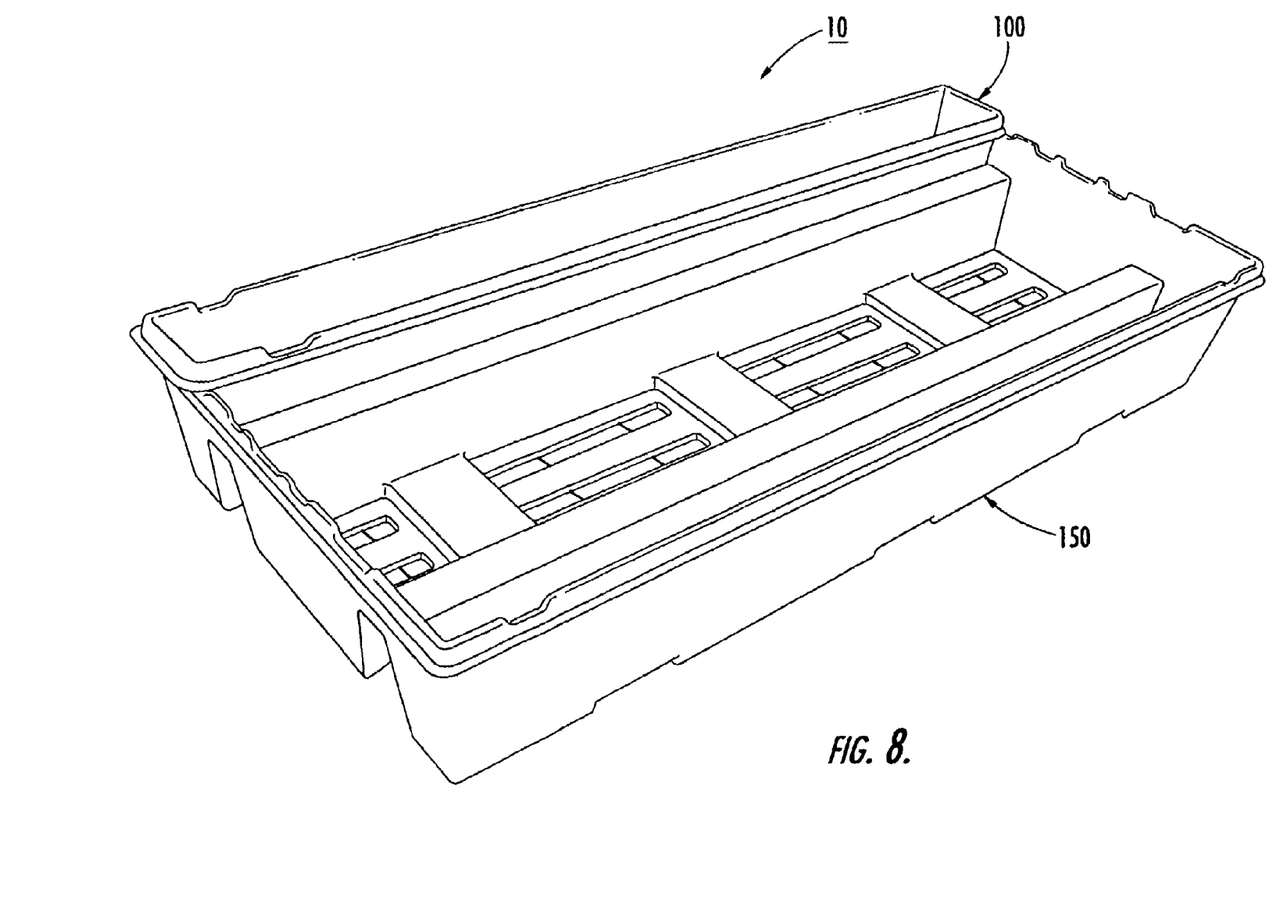
FIG. 8 is a perspective view of the plant tray system of FIG. 1 in a first configuration.
Figure 9:
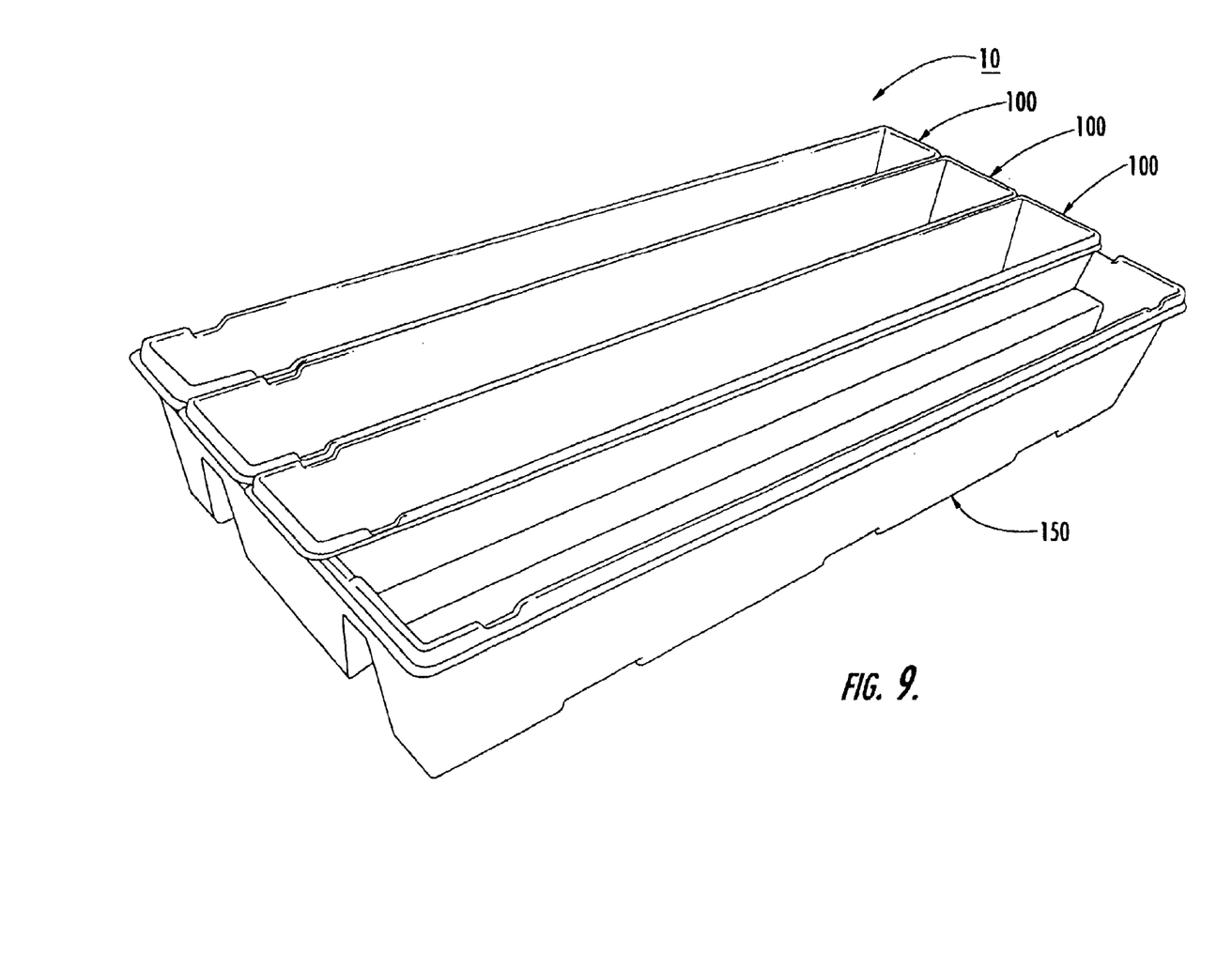
FIG. 9 is a perspective view of the plant tray system of FIG. 1 in a further configuration.
Figure 12:
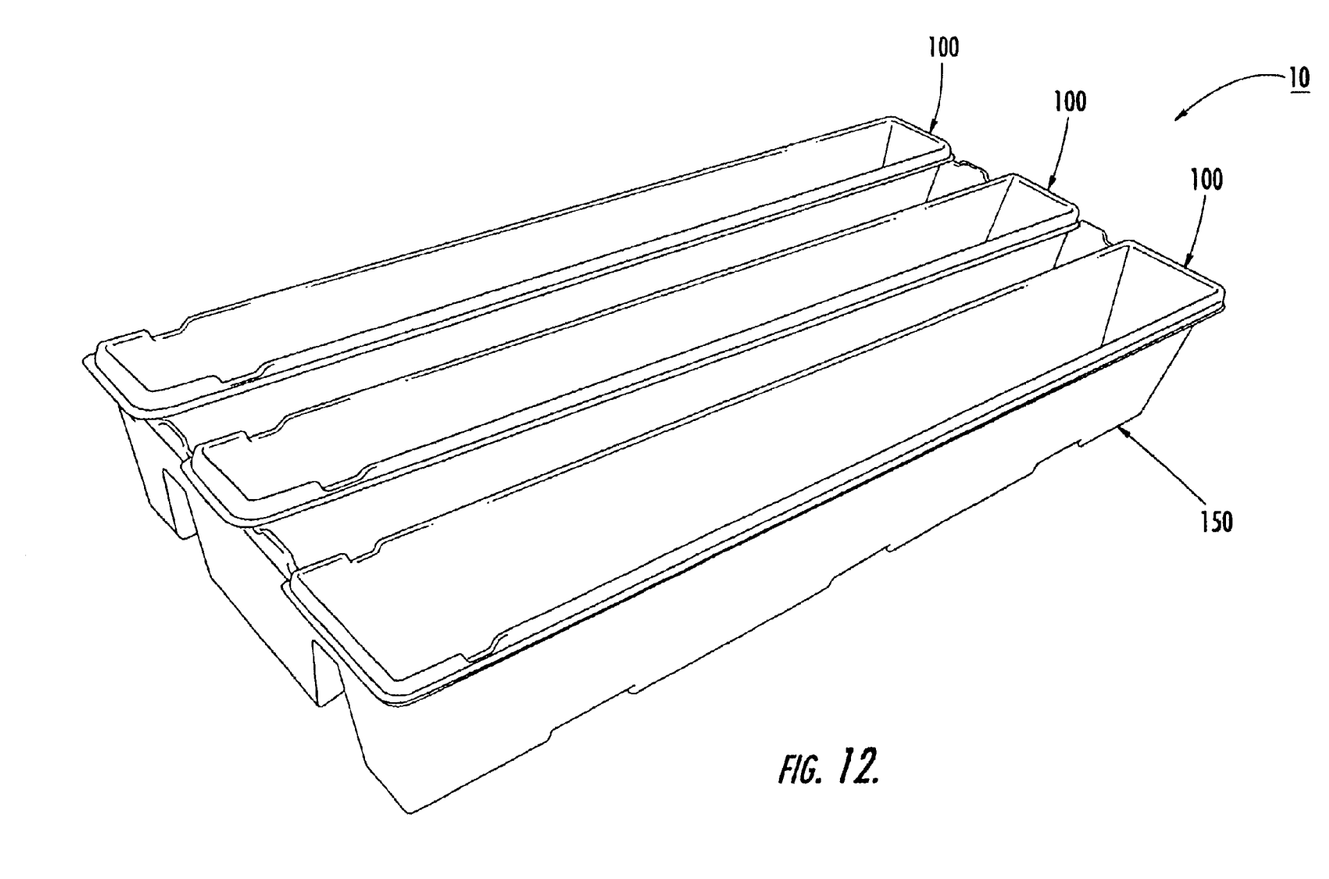
FIG. 12 is a perspective view of the plant tray system of FIG. 1 in a further configuration.

With reference to FIG. 8, according to one configuration, a tray 100 is placed in the trough 152A. According to another configuration as shown in FIG. 9, two additional trays 100 are placed in the trough 152B in side-by-side arrangement. With reference to FIGS. 10 and 11, a further tray 100 may be placed in the trough 152C. With reference to FIG. 12 a pair of trays 100 may be placed in the troughs 152A and 152C with a third tray 100 placed alone in the center of the trough 152B. It will be appreciated that a number of additional configurations are also possible: a pair of trays may be held in the trough 152B with the troughs 152A and 152B remaining empty; a pair of trays may be held in the troughs 152A and 152C with the trough 152B remaining empty; a tray may be held in the trough 152C with the troughs 152A and 152B remaining empty; three trays may be held in the troughs 152B and 152C with the trough 152A remaining empty; and a tray may be held in the center of the trough 152B with one or both of the troughs 152A and 152C being empty.

The several tray configurations listed above allow for great flexibility in using the tray system 10. One to four trays may be added to and removed from the flat 150 as needed while maintaining the stability of the tray system 10 and securely locating the tray or trays 100 in the flat 150. The tray configurations also allow for equal spacing between two, three, or four trays.

The system 10 effectively accommodates plant borders of different dimensions. For example, four plant borders 101 with plants 5 of relatively modest sizes may be mounted as shown in FIG. 10. On the other hand, three plant borders 101 having relatively large plants 5 may be mounted in the flat 150 as shown in FIG. 12 to allow greater spacing between the plant borders.

The flat 150 and the trays 100 are cooperatively configured such that the trays 100 and the flat 150 stabilize one another to resist flexure (e.g., lateral bending, lengthwise bending, torsional flexure, or combinations thereof). As a result, the tray system 10 once assembled may have improved strength and/or rigidity as compared to the flat 150 or any of the individual trays 100 alone. Preferably and in accordance with certain preferred embodiments, the trays 100 and/or the flat 150 may be formed with thin walls, thereby reducing the material expense and weight (and attendant shipping costs and handling burden) as compared to thicker trays and/or flats that might otherwise be employed to attain the requisite rigidity.

As best seen in FIG. 11, the rim 180 of the flat 150 engages the collar of each tray 100 in the flat 150. Depending on the trough 152A, 152B, 152C within which the tray is mounted, the rim portions 188A, 188B, 188C 188D are received in the channel 126 of the tray. The channel 126 and the received rim portions are preferably of substantially the same size and shape. More particularly:

1. If a tray 100 is seated in the trough 152A or the trough 152C, the rim portions 188A and 188B adjacent the trough will be received in the channel 126 of the tray. Portions of the outer wall 121B of the collar 120 of the tray will seat in the recesses 184B at each end of the associated trough. Each of the recesses 124 on the outer side wall 110 of the tray 100 is received in a respective one of the recesses 184A;
2. If a pair of trays 100 are seated in the trough 152B, the rim portions 188C and 188C will be received in the channels 126 of the trays. Portions of the outer walls 121B of the collars 120 of the trays will seat in the recesses 184C and 184D at each end the trough 152B; and
3. If a tray is seated in the center of the trough 152B as shown in FIG. 11, the rim portions 188D adjacent the trough will be received in the channel 126 of the tray. Portions of the outer wall 121B of the collar 120 of the tray will seat in the recesses 184C at each end of the trough 152B.

Figure 4:
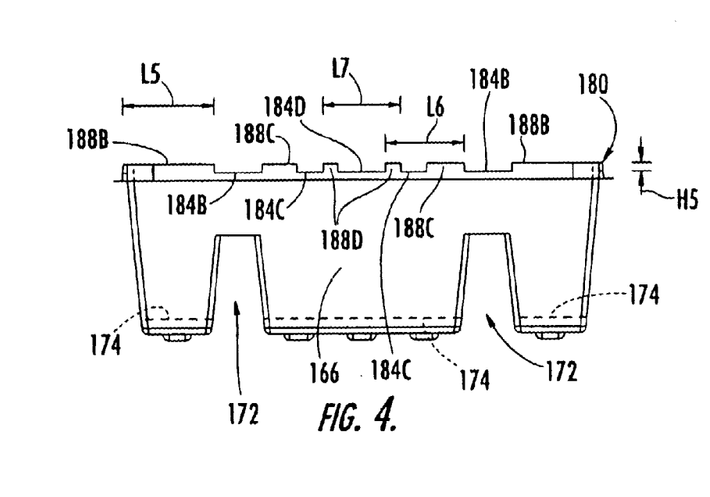
FIG. 4 is an end view of the flat of FIG. 2.
Figure 5:
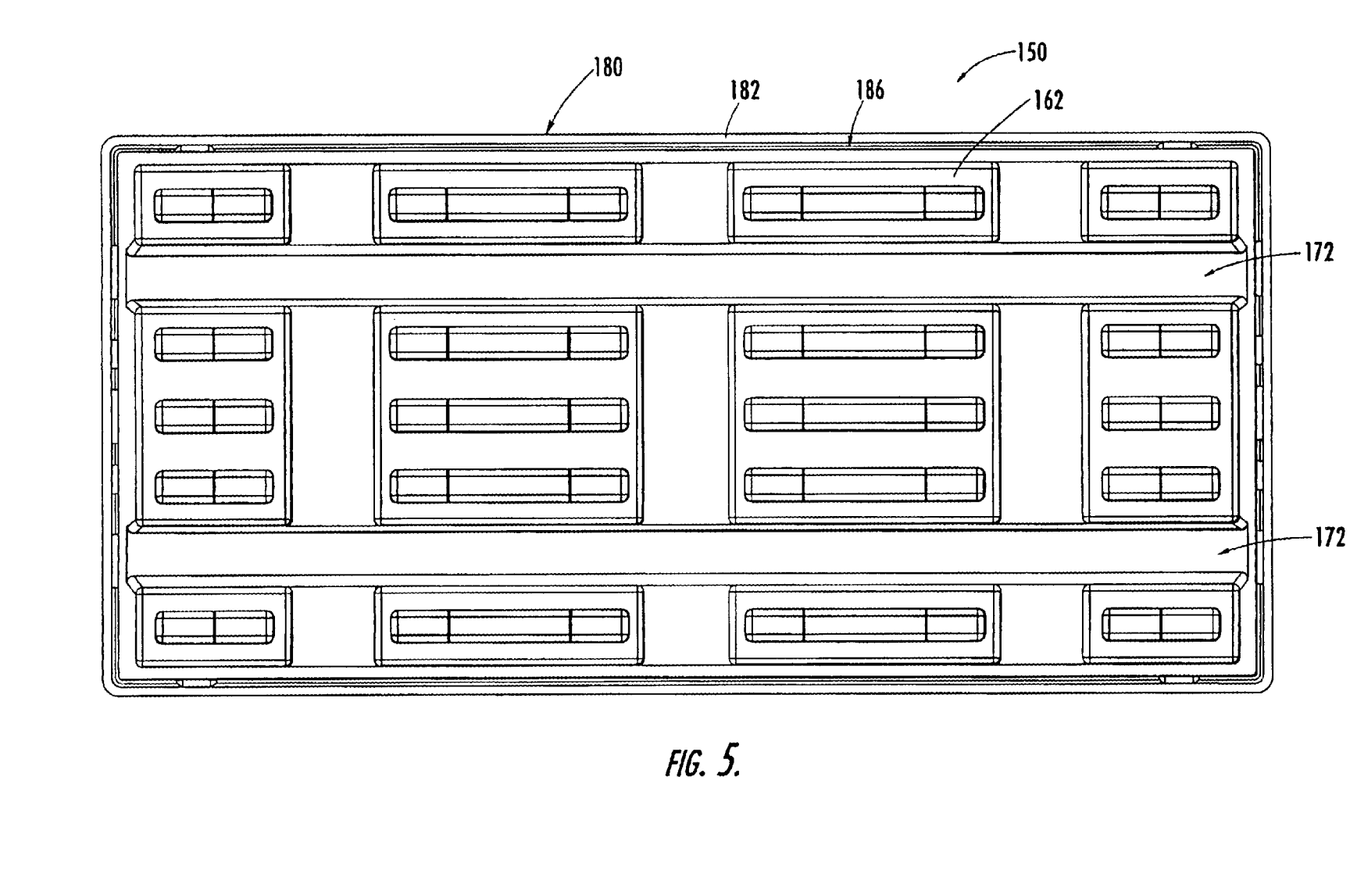
FIG. 5 is a bottom plan view of the flat of FIG. 2.

With reference to FIG. 4, the length L5 of the rim portion 188B along the wall 166, the distance L6 between the outer edge of each rim portion 188C and the inner edge of the adjacent rim portion 188D, and the distance L7 between the outer edges of the rim portions 188D are preferably slightly less than the width of the lateral portion of the channel 126. More preferably, the distances L5, L6, L7 are between about 58 and 62 mm less than the receiving lateral length of the channel 126.

The troughs 152A, 152B, 152C are shaped to correspond to the shapes of the walls 110, 116 of the trays 100. More particularly, the walls 160, 166, 170A, 170B of the flat 150 are sloped at substantially the same angle as the corresponding walls 110, 116, respectively. The walls 160, 166, 170A, 170B of the flat 150 are spaced apart such that they are in close proximity to the adjacent walls of the tray. Preferably, the tolerances between each of the walls 160, 166, 170A, 170B of the flat 150 and the adjacent walls of the tray in each trough 152A, 152B, 152C are between about 0.05 and 1.0 mm.

The raised bottom walls 174 may serve to maintain the trays 100 above a surface (e.g., the ground) supporting the tray system 10. In this manner, the walls 174 may serve to keep the lower portions of the trays (and the contents thereof) out of a pool of water or the like collected on a support surface. Preferably, the trays 100 and the flat 150 are relatively dimensioned such that the trays 100 rest on the walls 174 rather than fully hanging from the rim 180. Preferably, when the trays and flat are so situated, the rim 180 extends into between about 50 and 75 percent of the depth of the channels 126. Preferably substantially the full height H5 (FIG. 4) is received in the channels 126.

Notably, regardless of the selected tray configuration, the trays 100 may be securely positioned in the flat 150 so that the trays 100 do not slide in the flat 150. Such positive location is provided by the engagements of the trays 100 with the rim portions 184A, 184B, 184C, 184D and the recesses 188A, 188B, 188C, 188D, as well as the seating within the complementary troughs 152A, 152B, 152C.

Each plant border 6 held in the tray system 10 may be removed from the flat 150 when needed. The plant border 6 may be planted in a desired location in the ground by digging or otherwise forming a trench as described in Applicant's co-pending U.S. patent application Ser. No. 09/871,132, filed May 31, 2001, titled Trays for Plant Borders and Methods for Planting Plant Borders, inventor Todd Anthony Layt, the disclosure of which is incorporated herein by reference in its entirety. The tray 100 is cut or hand pulled (torn) along the recesses 124 and those portions of the tray walls 110, 112, 114 extending between the recesses 124. The tray 100 may be cut using, for example, scissors, a knife or the like. An end portion formed by the cut is removed or folded away from a remaining portion of the tray to form an end opening. The plant border 6 is then slid out of the remaining tray portion through the opening and into the trench. In this manner, the plant border 6 may be removed from the tray 100 and installed in the trench with reduced or minimal disruption to the plant border 6. That is, the tear away or cut away feature allows for internal loading of soil and root pressure but also allows for easy hand tearing away or cutting, which allows for easy plant removal without damaging the plant.

While particular plant trays 100 have been described herein, one or more of the plant trays 100 may be modified or replaced as desired. For example, any of the plant trays disclosed in the aforementioned co-pending U.S. patent application Ser. No. 09/871,132, may be used in place of the trays 100.

Two or more of the plant trays 100 may be joined together. For example, two or more of the plant trays 100 may be integrally molded and joined along their adjacent flanges 122. Perforations may be formed along the joinder to allow easy separation of the trays from one another when desired. Webbing may be provided between and joined (for example, by integrally molding) to the flanges of each of the trays, for example, as disclosed in the aforementioned co-pending U.S. patent application Ser. No. 09/871,132. Perforations may be provided between the webbing and the plant trays.

The flat 150 may be modified to hold more or less than four plant trays. The flat 150 may be modified to hold plant trays of other dimensions or configurations.

The flat 150 may be colored differently than the plant trays 100 to allow for quick and convenient assessment of the number and arrangement of plant trays or plant borders in the flat.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A plant tray system comprising:
   a) a flat defining a flat cavity and a flat top opening communicating with the flat cavity, the flat including an upstanding rim surrounding at least a portion of the flat top opening; and
   b) a plant fray defining a tray cavity and a tray top opening communicating with the tray cavity, the tray cavity having a tray width and a tray length that is greater than the tray width, the plant tray including a collar surrounding at least a portion of the tray top opening, the collar defining a downwardly opening channel;
   c) wherein the flat is adapted to receive the plant tray in the flat cavity such that the rim is received in the channel and the flat is thereby structurally reinforced by the plant tray to resist flexure;
   d) wherein the rim includes a plurality of spaced apart, upstanding projections adapted to engage the channel of the plant tray.

2. The plant tray system of claim 1 wherein the flat and the plant tray are each formed of a respective flexible, polymeric material.

3. The plant tray system of claim 2 wherein the respective polymeric materials are each selected from the group consisting of high impact polystyrene, ABS, PVC and polypropylene.

4. The plant tray system of claim 2 wherein the flat and the plant tray are each formed substantially of walls having a thickness of less than 0.07 mm.

5. The plant tray system of claim 1 wherein the flat includes a lengthwise extending separator wall forming at least first and second lengthwise extending troughs in the flat cavity, wherein the first trough is adapted to receive the plant tray in close proximity such that the flat is thereby structurally reinforced by the plant tray to resist flexure.

6. The plant tray system of claim 5 including a second plant tray and wherein the second trough is adapted to receive both of the first and second plant trays in side by side relation such that the flat is thereby structurally reinforced by the first and second plant trays to resist flexure.

7. The plant tray system of claim 6 wherein the second trough is further adapted to receive the first plant tray alone such that the flat is thereby structurally reinforced by the first plant tray to resist flexure.

8. The plant tray system of claim 6 wherein:
   the second plant tray has a second collar defining a downwardly opening second channel; and
   the flat is adapted such that the rim is received in the second channel when the second plant tray is disposed in the second trough and the flat is thereby structurally reinforced by the second plant tray to resist flexure.

9. The plant tray system of claim 6 wherein the flat includes a lengthwise extending second separator wall defining the second trough and a lengthwise extending third trough in the flat cavity, wherein the third trough is adapted to receive one of the first and second plant trays in close proximity such that the flat is thereby structurally reinforced by the received plant tray to resist flexure.

10. The plant tray system of claim 9 wherein:
    the third plant tray has a third collar defining a downwardly opening third channel; and
    the flat is adapted such that the rim is received in the third channel when the third plant tray is disposed in the third trough and the flat is thereby structurally reinforced by the third plant tray to resist flexure.

11. The plant tray system of claim 1 wherein the rim has a generally inverted U-shaped cross-section and is adapted to reinforce the flat.

12. The plant tray system of claim 1 wherein the flat includes a bottom wall and at least one laterally extending raised wall adapted to separate the plant tray from the bottom wall when the plant tray is disposed in the flat cavity.

13. The plant tray system of claim 1 comprising a plant border including a growing medium disposed in the tray cavity and a strip of plants disposed in the growing medium in the tray cavity.

14. The plant tray system of claim 1 wherein the tray length is at least six times the tray width.

15. The plant tray system of claim 1 wherein:
the flat cavity has a length extending from a first end of the flat to an opposed second end of the flat; and
the length of the tray cavity is substantially coextensive with the length of the flat cavity.

16. The plant tray system of claim 15 including a second plant tray and wherein:
a) the second plant tray defines a second tray cavity and a second tray top opening communicating with the second tray cavity, the second tray cavity having a second tray width and a second tray length that is greater than the second tray width, the second plant tray including a second collar surrounding at least a portion of the second tray top opening, the second collar defining a downwardly opening second channel;
b) wherein the flat is adapted to receive the second plant tray in the flat cavity such that the rim is received in the second channel and the flat is thereby structurally reinforced by the second plant tray to resist flexure;
c) the second length of the second tray cavity is substantially coextensive with the length of the flat cavity; and
d) the first and second trays are disposed in side-by-side, substantially parallel arrangement.

17. A plant tray system comprising:
a) a flat defining a flat cavity and a flat top opening communicating with the flat cavity, the flat including an upstanding rim surrounding at least a portion of the flat top opening;
b) a plant tray defining a tray cavity and a tray top opening communicating with the tray cavity, the tray cavity having a tray width and a tray length that is greater than the tray width, the plant tray including a collar surrounding at least a portion of the tray top opening, the collar defining a downwardly opening channel; and
c) wherein the flat is adapted to receive the plant tray in the flat cavity such that the rim is received in the channel and the flat is thereby structurally reinforced by the plant tray to resist flexure; and
d) wherein the plant tray system further includes a second plant tray having a second collar defining a downwardly opening second channel; and
e) wherein the rim includes a plurality of spaced apart, upstanding projections adapted to engage the first and second channels to positively locate each of the first and second plant trays in the flat cavity.

18. A plant tray system comprising:
a) a flat defining a flat cavity and a flat top opening communicating with the flat cavity, the flat including an upstanding rim surrounding at least a portion of the flat top opening; and
b) a plant tray defining a tray cavity and a tray top opening communicating with the tray cavity, the tray cavity having a tray width and a tray length that is greater than the tray width, the plant tray including a collar surrounding at least a portion of the tray top opening, the collar defining a downwardly opening channel;
c) wherein the flat is adapted to receive the plant tray in the flat cavity such that the rim is received in the channel and the flat is thereby structurally reinforced by the plant tray to resist flexure; and d) wherein:
the collar of the plant tray includes a collar recess extending downwardly into the channel; and
the rim of the flat includes an upwardly facing rim recess adapted to receive the collar recess to allow to the collar to seat on a remaining portion of the rim.

19. The plant tray system of claim 18 wherein the plant tray has an end portion and the collar recess is adapted to facilitate removal of the end portion to form an end opening through which a plant border can be removed from the cavity of the plant tray.

20. A flat for carrying and supporting plant tray of the type defining a tray cavity and a tray top opening communicating with the tray cavity, the tray cavity having a tray width and a tray length that is greater than the tray width, the plant tray including a collar surrounding at least a portion the tray top opening, the collar defining a downwardly opening channel, wherein:
a) the flat defines a flat cavity and a flat top opening communicating with the flat cavity;
b) the flat includes an upstanding rim surrounding at least a portion the flat top opening;
c) the flat is adapted to receive the plant tray in the flat cavity such that the rim is received in the channel and the flat is thereby structurally reinforced by the plant tray to resist flexure; and
d) the rim includes a plurality of spaced apart, upstanding projections adapted to engage the channel of the plant tray.

21. The flat of claim 20 wherein the flat is formed of a flexible, polymeric material.

22. The flat of claim 21 wherein the polymeric material is selected from the group consisting of high impact polystyrene, ABS, PVC and polypropylene.

23. The flat of claim 20 wherein the flat is formed substantially of walls having a thickness of less than 0.07 mm.

24. The flat of claim 23 wherein the flat is formed substantially of walls having a thickness of between about 0.02 and 0.07 mm.

25. The flat of claim 20 including a lengthwise extending separator wall forming at least first and second lengthwise extending troughs in the flat cavity, wherein the first trough is adapted to receive the plant tray in close proximity such that the flat is thereby structurally reinforced by the plant tray to resist flexure.

26. The flat of claim 25 wherein the second trough is adapted to receive first and second plant trays in side by side relation such that the flat is thereby structurally reinforced by the first and second plant trays to resist flexure.

27. The flat of claim 26 wherein the second trough is further adapted to receive the first plant tray alone such that the flat is thereby structurally reinforced by the first plant tray to resist flexure.

28. The flat of claim 26 wherein the flat includes a lengthwise extending second separator wall defining the second trough and a lengthwise extending third trough in the flat cavity, wherein the third trough is adapted to receive one of the first and second plant trays in close proximity such that the flat is thereby structurally reinforced by the first and second plant trays to resist flexure.

29. The flat of claim 20 wherein the rim has a generally inverted U-shaped cross-section and is adapted to reinforce the flat.

30. The flat of claim 20 including a bottom wall and at least one laterally extending raised wall adapted to separate the plant tray from the bottom wall when the plant tray is disposed in the flat cavity.

31. A flat for carrying and supporting a plant tray of the type defining a tray cavity and a tray top opening communicating with the tray cavity, the tray cavity having a tray width and a tray length that is greater than the tray width, the plant tray including a collar surrounding at least a portion the tray top opening, the collar defining a downwardly opening channel, wherein:
   a) the flat defines a flat cavity and a flat top opening communicating with the flat cavity;
   b) the flat includes an upstanding rim surrounding at least a portion the flat top opening;
   c) the flat is adapted to receive the plant tray in the flat cavity such that the rim is received in the channel and the flat is thereby structurally reinforced by the plant tray to resist flexure; and
   d) the rim includes a plurality of spaced apart, upstanding projections adapted to engage the respective channels of a plurality of plant trays to positively locate each of the plant trays in the flat cavity.

32. A flat for carrying and supporting a plant tray of the type defining a tray cavity and a tray top opening communicating with the tray cavity, the tray cavity having a tray width and a tray length that is greater than the tray width, the plant tray including a collar surrounding at least a portion the tray top opening, the collar defining a downwardly opening channel, wherein:
   a) the flat defines a flat cavity and a flat top opening communicating with the flat cavity;
   b) the flat includes an upstanding rim surrounding at least a portion the flat top opening;
   c) the flat is adapted to receive the plant tray in the flat cavity such that the rim is received in the channel and the flat is thereby structurally reinforced by the plant tray to resist flexure; and
   d) the rim of the flat includes an upwardly facing rim recess adapted to receive a collar recess of the plant tray to allow to the collar to seat on a remaining portion of the rim.

33. A method for using a plant tray system, comprising the steps of:
   a) providing a flat defining a flat cavity and a flat top opening communicating with the flat cavity, the flat including an upstanding rim surrounding at least a portion the flat top opening;
   b) providing a plant tray defining a tray cavity and a tray top opening communicating with the tray cavity, the tray cavity having a tray width and a tray length that is greater than the tray width, the plant tray including a collar surrounding at least a portion the tray top opening, the collar defining a downwardly opening channel; and
   c) placing the plant tray into the flat cavity such that the rim is received in the channel and the flat is thereby structurally reinforced by the plant tray to resist flexure;
   d) wherein said step of placing the plant tray includes placing the plant tray on in the flat cavity such that a collar recess formed in the collar and extending downwardly into the channel is received in an upwardly facing rim recess formed in the rim such that the collar seats on a remaining portion of the rim.

34. The method of claim 33 wherein the flat and the plant tray are each formed of a respective flexible, polymeric material.

35. The method of claim 33 wherein:
   the flat includes a lengthwise extending separator wall forming at least first and second lengthwise extending troughs in the flat cavity; and
   said step of placing the plant tray includes placing the plant tray into the first trough such that the flat is thereby structurally reinforced by the plant tray to resist flexure.

36. The method of claim 35 wherein the flat includes first and second lengthwise extending separator walls forming first, second and third lengthwise extending troughs in the flat cavity, the second trough being defined between the first and second separator walls and the first and third troughs being defined on opposed sides of the first and second separator walls.

37. The method of claim 36 including the step of placing the plant tray in the first trough that the flat is thereby structurally reinforced by the plant tray to resist flexure.

38. The method of claim 36 including the steps of placing a first plant tray in the second trough and placing a second plant tray in the second trough immediately adjacent the first plant tray such that the first and second plant trays cooperatively reinforce the flat to resist flexure.

39. The method of claim 38 further including the step of placing a third plant tray in the first trough such that the flat is thereby structurally reinforced by the third plant tray to resist flexure.

40. The method of claim 39 further including the step of placing a fourth plant tray in the third trough such that the flat is thereby structurally reinforced by the fourth plant tray to resist flexure.

41. The method of claim 33 including placing a growing medium in the tray cavity.

42. The method of claim 41 including growing a plurality of plants in the growing medium while the growing medium is in the tray cavity.

43. The method of claim 33 wherein:
   the flat cavity has a length extending from a first end of the flat to an opposed second end of the flat; and
   the step of placing the plant tray into the flat cavity includes placing the plant tray into the flat cavity such that the length of the tray cavity is substantially coextensive with the length of the flat cavity.

44. The method of claim 43 including:
   a) providing a second plant tray defining a second tray cavity and a second tray top opening communicating with the second tray cavity, the second tray cavity having a second tray width and a second tray length that is greater than the second tray width, the second plant tray including a second collar surrounding at least a portion of the second tray top opening, the second collar defining a downwardly opening second channel; and
   b) placing the second plant into the flat cavity such that:
      the rim is received in the second channel and the flat is thereby structurally reinforced by the second plant tray to resist flexure;
      the second length of the second tray cavity is substantially coextensive with the length of the flat cavity; and
      the first and second trays are disposed in side-by-side, substantially parallel arrangement.

* * * * *